Oct. 18, 1938.  H. M. DILLHOEFER  2,133,852

CONTAINER

Original Filed Dec. 15, 1933   5 Sheets-Sheet 1

INVENTOR.
Henry M. Dillhoefer
BY
Geo. B Pitts
ATTORNEY.

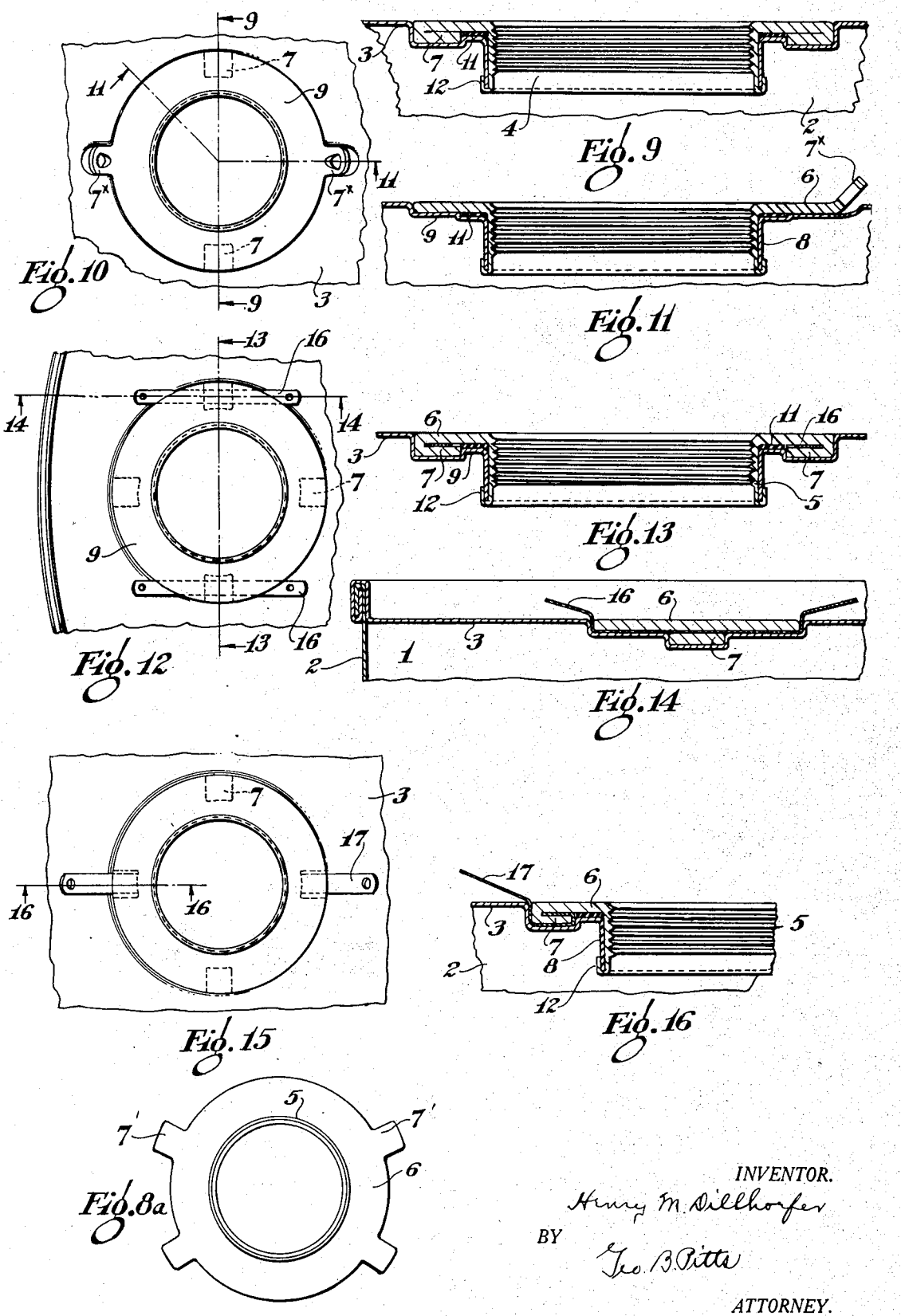

Oct. 18, 1938.  H. M. DILLHOEFER  2,133,852
CONTAINER
Original Filed Dec. 15, 1933    5 Sheets-Sheet 3

INVENTOR.
Henry M. Dillhoefer
BY
Geo. B. Pitts
ATTORNEY.

Oct. 18, 1938.  H. M. DILLHOEFER  2,133,852

CONTAINER

Original Filed Dec. 15, 1933  5 Sheets-Sheet 4

INVENTOR.
Henry M. Dillhoefer
BY Geo. B. Pitts
ATTORNEY.

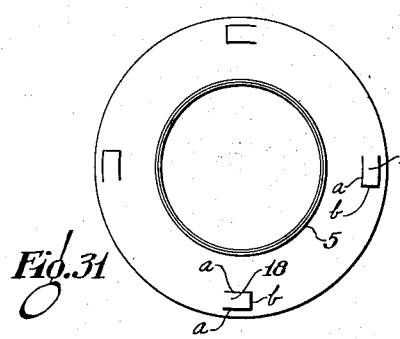
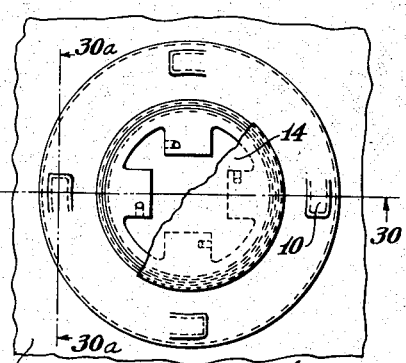
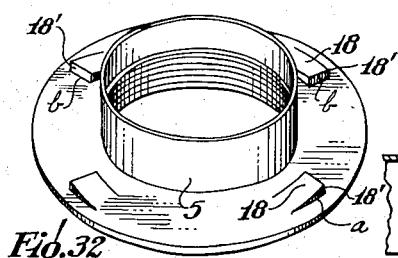
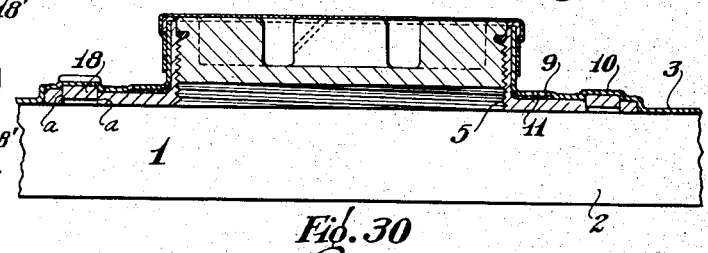
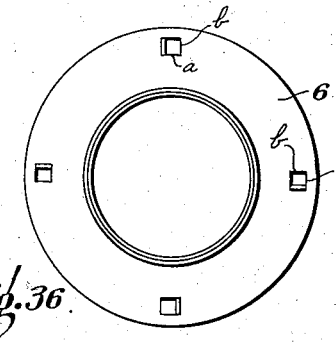
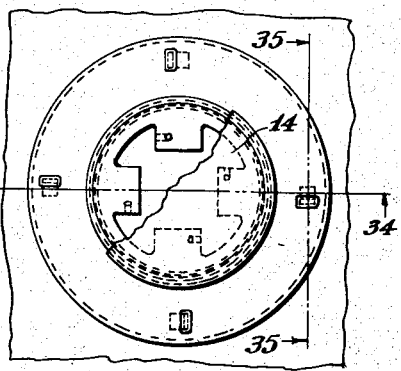
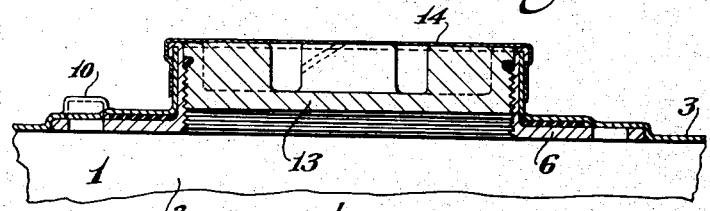
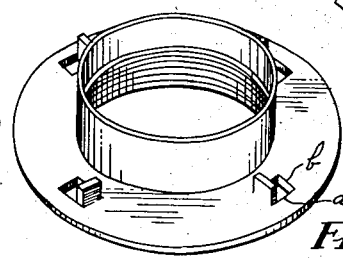

Patented Oct. 18, 1938

2,133,852

UNITED STATES PATENT OFFICE 2,133,852

CONTAINER

Henry M. Dillhoefer, Cleveland Heights, Ohio

Application December 15, 1933, Serial No. 702,587
Renewed March 14, 1938

9 Claims. (Cl. 285—49)

This invention relates to a container, more particularly an improved bung ring and mounting therefor.

One object of the invention is to provide an improved mounting of the pressed-in type wherein the ring is rigidly secured in a simple manner against turning or looseness and may be mounted in either position in the container wall and arranged, when desired, to present a flush surface interiorly or exteriorly with the container wall.

Another object of the invention is to provide an improved bung ring and mounting therefor in which the connection between the ring and the metal wall comprises seating embossments into which portions of the bung ring flange, disposed within the periphery of the flange, project, such portions being so shaped and arranged that the ring may be readily assembled in fixed relation to the metal wall with minimum stresses thereon.

Another object of the invention is to provide an improved bung ring which lends itself for ready mounting in the container wall with minimum stresses thereon and attachment of various types of sealing elements.

Another object is to construct an improved bung ring and mounting therefor, wherein a sealing element may be incorporated therewith without the employment of additional dies.

Other objects of the invention will be apparent to those skilled in the art to which my invention relates from the following description taken in connection with the accompanying drawings, wherein Fig. 1 is a fragmentary plan view of a container provided with a bung ring embodying the invention, parts being broken away.

Figure 4:
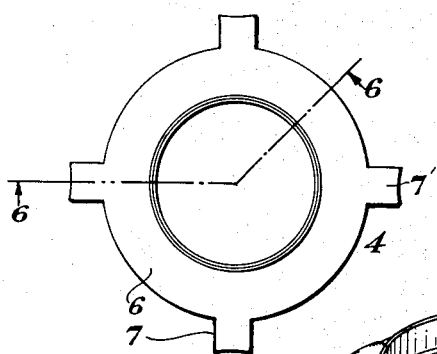
Fig. 4 is a plan view of the ring after being blanked out and drawn.
Figure 5:
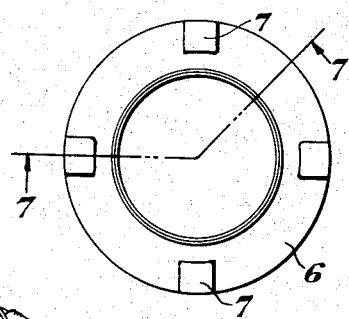
Fig. 5 is a plan view of the ring showing all of its extensions folded inwardly upon the inner face of the flange.
Figure 6:
Figure 7:
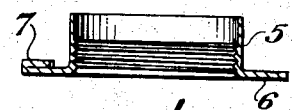

Figs. 6 and 7 are sections on the lines 6—6 of Fig. 4 and 7—7 of Fig. 5, respectively.

Figure 8:

Fig. 8 is a perspective view of the ring.

Fig. 8a is a plan view of the ring, similar to Fig. 4, but in which the extensions are non-uniformly spaced around the ring flange.

Figure 3:
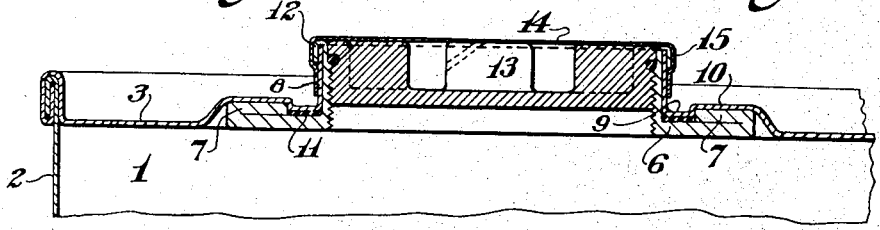
Fig. 3 is a section on the line 3—3 of Fig. 1, enlarged.

Fig. 9 is a view similar to Fig. 3 but showing a modification.

Fig. 10 is a view showing a different embodiment.

Fig. 11 is a section on the line 11—11 of Fig. 10, enlarged.

Figure 1:
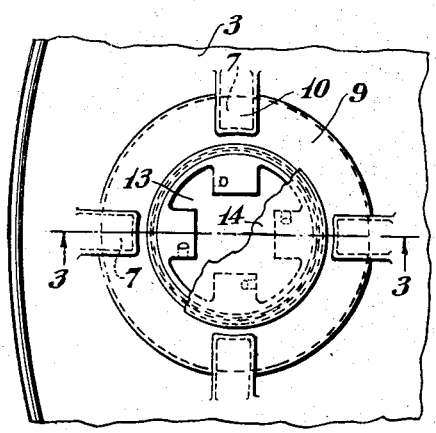
Figure 2:
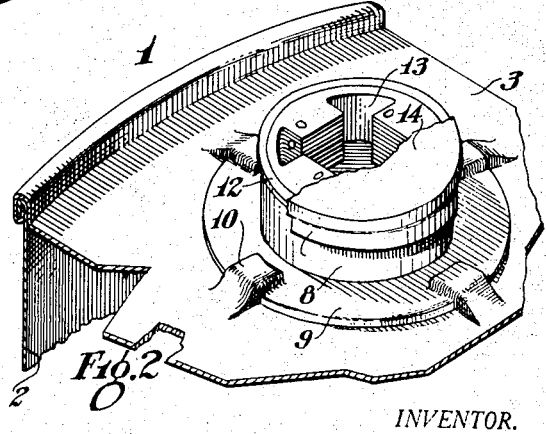
Fig. 2 is a perspective view of the parts shown in Fig. 1.

Fig. 12 is a view similar to Fig. 1, but showing the attachment of sealing elements.

Figs. 13 and 14 are sections on the lines 13—13 and 14—14, respectively, of Fig. 12, enlarged.

Fig. 15 is a view similar to Fig. 12 but showing a different form of sealing attachment.

Fig. 16 is a fragmentary section on the line 16—16 of Fig. 15.

Figure 17:
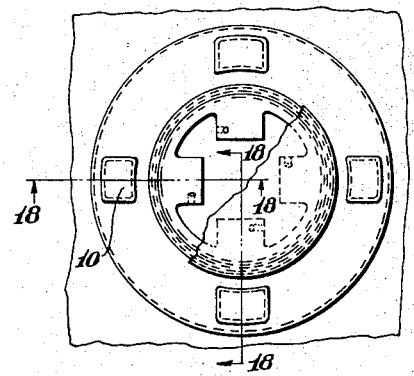

Fig. 17 is a plan view similar to Fig. 1, but showing a different embodiment of the invention.

Figure 18:
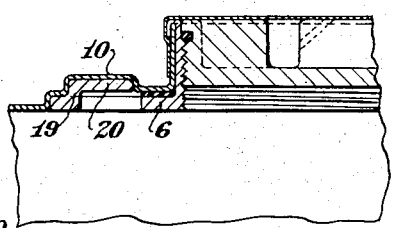

Fig. 18 is a fragmentary section on the line 18—18 of Fig. 17.

Figure 19:
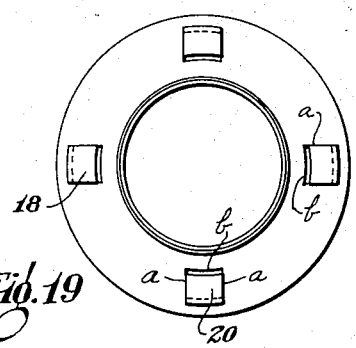
Figure 20:
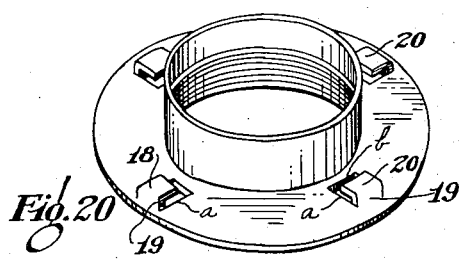

Figs. 19 and 20 are plan and perspective views, respectively of the ring shown in the embodiment shown in Figs. 17 and 18.

Figure 21:
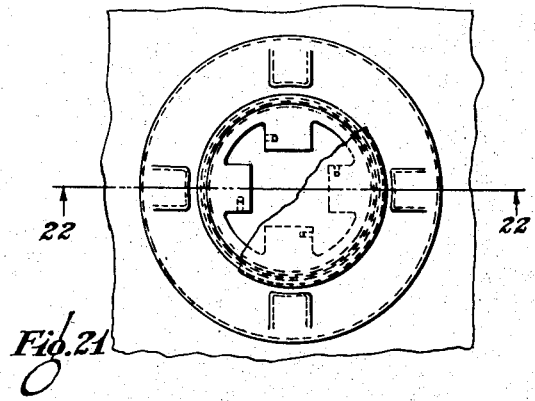

Fig. 21 is a plan view similar to Fig. 1, but showing another embodiment of the invention.

Figure 22:
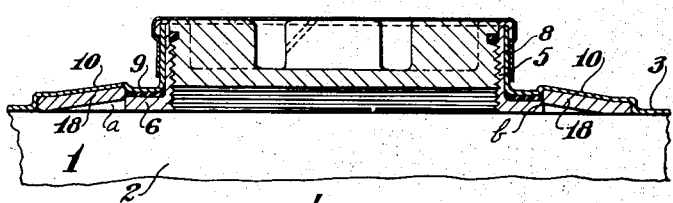

Fig. 22 is a section on the line 22—22 of Fig. 21.

Figure 23:
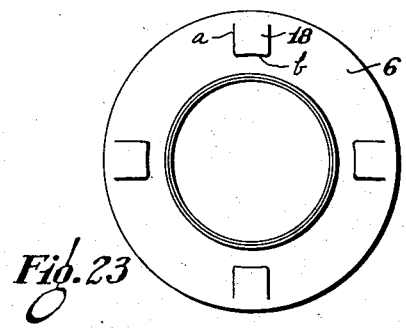
Figure 24:
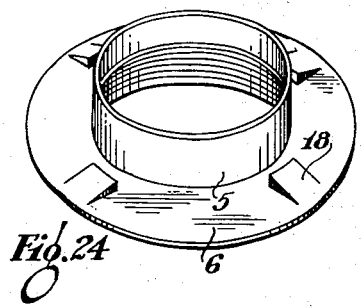

Figs. 23 and 24 are plan and perspective views, respectively of the ring shown in the embodiment shown in Figs. 21 and 22.

Figure 25:
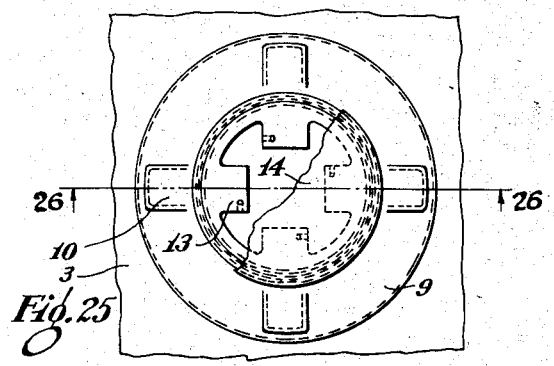

Fig. 25 is a view similar to Fig. 21 in which the embodiment is modified.

Figure 26:
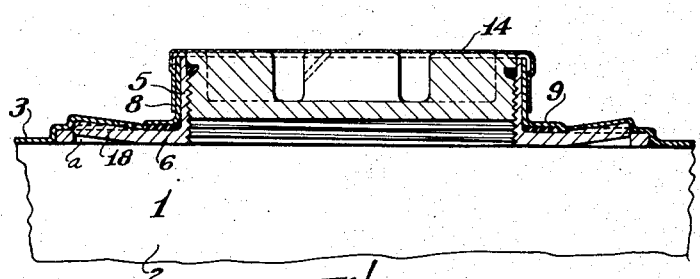

Fig. 26 is a section on the line 26—26 of Fig. 25.

Figure 27:
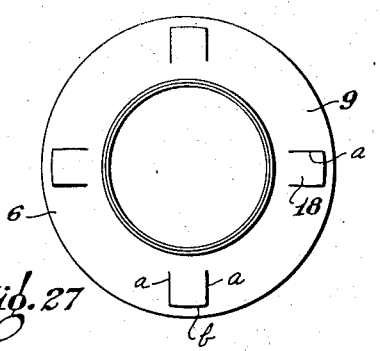
Figure 28:
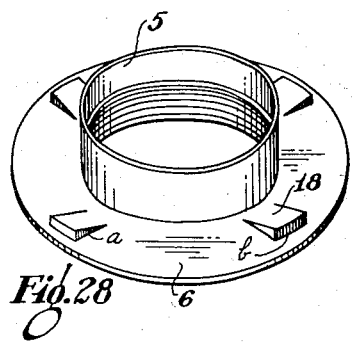

Figs. 27 and 28 are plan and perspective views, respectively, of the ring shown in Figs. 25 and 26.

Fig. 29 is a view similar to Fig. 21, but showing a different modification.

Figs. 30 and 30a are sections on the lines 30—30 and 30a—30a, respectively, of Fig. 29.

Figs. 31 and 32 are plan and perspective views, respectively, of the ring shown in Figs. 29 and 30.

Fig. 33 is a view similar to Fig. 21, but showing a further modification.

Figs. 34 and 35 are sections on the lines 34—34 and 35—35, respectively, of Fig. 33.

Figs. 36 and 37 are plan and perspective views, respectively, of the ring shown in Figs. 33 and 34.

Figure 38:
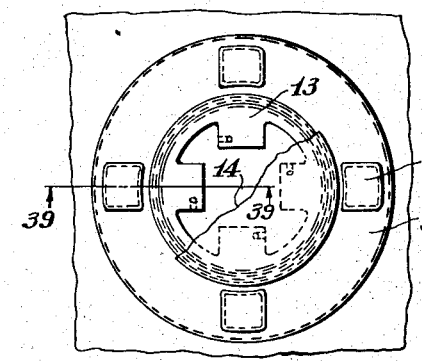

Fig. 38 is a view similar to Fig. 21 but showing a further embodiment of the invention.

Figure 39:
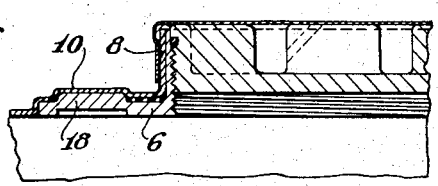

Fig. 39 is a fragmentary section on the line 39—39 of Fig. 38.

Figure 40:
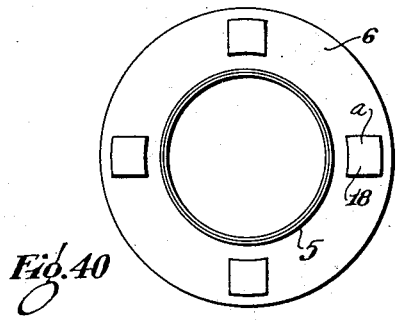
Figure 41:
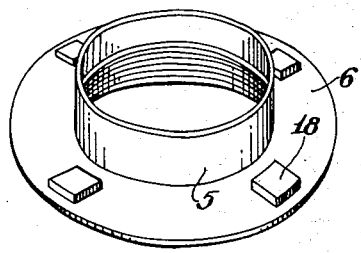

Figs. 40 and 41 are plan and perspective views, respectively, of the ring shown in Figs. 38 and 39.

Figure 42:
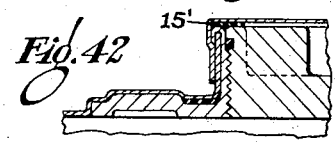

Fig. 42 is a fragmentary section showing the use of a gasket below the sealing cap.

In the drawings, 1 indicates a container having a side wall 2 and heads 3, only one of which is shown. The bung ring, indicated as an entirety at 4, is shown mounted in the head. The ring 4 may be forged, but preferably consists of a stamping which is blanked out and drawn to form a body or neck 5 and an outwardly extending flange 6 at one end. The flange 6 is provided on its inner face, within its periphery, with integral devices which fit into embossments formed in the metal wall (for example, the head 3) of the container and interlock with the side walls thereof to prevent rotative movement relative to container wall or looseness due to the insertion of a plug or other fitting into the ring or its removal therefrom.

In the form of construction shown in Figs. 1 to 16, inclusive, the interlocking devices comprise metal sections 7 lying flat on the inner face of the flange and integrally connected at their outer ends to the edge or periphery of the flange 6. In providing the sections 7 in this form of construction, the ring may be blanked from a sheet metal with extensions 7', as shown in Fig. 4. These extensions may be uniformly spaced around the periphery of the flange, as shown in Fig. 4, or disposed in any other spaced relation, such as shown in Fig. 8a; this latter arrangement insuring a more economical use of the metal sheet from which the ring blanks are stamped. Where the plug is to be sealed against tampering, the sealing means may require two or more of the extensions to bear a predetermined relation, such as shown, for example, in Fig. 10. The extensions 7' are relatively narrow and preferably provided with parallel sides and of less length than the width of the flange 6 at either side of the body 5, for a purpose which will later appear. The extensions 7' are folded over on the inner surface of the flange 6, as shown in Figs. 5, 7 and 8, to form the interlocking elements or devices 7 on the flange within its periphery. The ring 4 may then be inserted into a suitable sizing machine to make the periphery of the flange, particularly throughout the portions adjacent the folded extensions 7', concentric to the axis of the ring, to facilitate the seating of the flange in its seat (later referred to) in the wall or head 3.

The head 3 is formed with an opening having a laterally extending neck 8, and around the neck 8 the adjacent portion of the head 3 is embossed to form depressions or pockets 10, which receive the interlocking elements 7. In the preferred arrangement, the metal wall 3 around the neck 8 is embossed to form an annular seat 9 for the ring flange 6 and the bottom wall of the seat 9 is embossed to form the pockets 10. In assembly, (a) a gasket 11 is mounted on the flange 6 between the ring neck 5 and inner ends of the elements 7, (b) the ring neck or body 5 extends into and through the neck 8, (c) the flange 6 fits into the embossed seat 9, (d) the interlocking elements 7 fit into the pockets 10 and (e) the circumferential free or outer end of the ring neck 5, which is reduced in thickness, is bent or curled over the circumferential free end of the neck 8, as shown at 12, thereby securing the flange 6 in its seat with the elements or the devices 7 seated in their respective embossments or pockets 10. The pockets 10 are complementary in shape, size and arrangement to the elements 7 and due to the engagement of each element 7 with the side walls of the adjacent pocket, the ring 4 is held against turning or looseness. As the side walls of the pockets 10 are integral with their inner and outer end walls and bottom walls, they are adequately reinforced to resist strains resulting from the tightening or loosening of a plug, one form of which is indicated as an entirety at 13, in the body or neck 5.

Any desired construction of plug may be used, that shown being of novel form; but no claim is made thereto as it forms the subject-matter of my co-pending application Ser. No. 699,757, Patent No. 2,024,029. The gasket 11 is preferably formed of rubber and if desired it may have a width slightly greater than the distance between the ring neck 5 and inner ends of the elements 7. In this arrangement the gasket 11 may be assembled on the flange and frictionally held thereon in position. This assembly can be made by the ring maker and thus eliminate separate handling of the gaskets in mounting the rings on container heads.

If desired, the side walls of the extensions 7' may converge in an outward direction, the convergence being such that when the extensions are disposed in their folded positions, their side walls will be on imaginary radii of the ring. In this arrangement the side walls of the pockets or embossments 10 will be correspondingly shaped and arranged.

Fig. 3 shows the ring 4 mounted in the head or wall 3 in an inverted position and arranged to provide a flush inner surface to insure complete drainage of the container. When the ring is mounted in this manner, a sealing cap 14 of thin sheet metal may be applied by bending the side wall 15 of the cap inwardly around the shoulder resulting from the curled portion 12. When a sealing cap is used I prefer to provide a gasket 15' between it and the plug 13 and curled end 12, as shown in Fig. 42.

Fig. 9 shows the ring 4 mounted in the head 3 with its neck 5 depending into the container, with the embossments in the head so arranged that the outer face of the flange 6 is in the plane of or flush with the head 3. When the ring is mounted in this position, the construction adapts itself to varying types of sealing devices. For example, two extensions 7' may be folded against the inner face of the flange 6 (see dotted lines in Fig. 10) and the other two extensions left in an extended position but slightly bent upwardly at their outer ends (as shown at 7x) and formed with openings to serve as sealing devices (either or both) for the attachment of a sealing means (not shown). Another form of sealing device consists in placing a bendable section 16 of thin metal between one or more devices 7 and the flange 6, each section preferably being disposed at right angles to the adjacent device, and extending at one or both ends of the section to a point beyond the flange periphery (Figs. 12, 13 and 14) tangentially thereto; in this arrangement the section 16 is clamped between the device 7 and flange 6 and also between the latter and the walls of its seat. Another form of sealing device consists in assembling a bendable section 17 of thin metal with one or more devices 7 with its inner end clamped between it and the flange, the section extending radially of the ring and beyond its flange (see Figs. 15 and 16); in this arrangement the section 17 is also clamped between the flange 6 and the walls of its seat. In the forms of construction shown in Figs. 12 to 16, inclusive, the sealing device or element is secured to the ring by the folding over of the adjacent extension 7' and becomes a part thereof so that separate handling of the device in mounting the ring is not required; also, such mounting does not require a special set of dies, as the sealing devices conform to the flange wall and the seat walls when the ring is inserted in position and pressure is applied to secure it in final position in the container wall.

Referring to Figs. 17 to 41, inclusive, the interlocking devices comprise sections 18 which are off-set or displaced relative to the flange 6, within its periphery. In Figs. 17 to 38, inclusive, each section 18 is formed by slitting the flange 6 on two parallel lines $a$ and at right angles to the parallel lines at one end of and between the latter, as shown at $b$. The sections may be uniformly spaced around the flange 6. In this arrangement, each section 18 is integrally connected at one end to the flange. In Figs. 17, 18, 19 and 20, the section 18 is bent upwardly substantially perpendicularly to the face of the flange, as shown at 19, and then laterally to dispose its end portion above and parallel to the flange 6, as shown at 20. As shown in Figs. 17 and 18, the embossments 10 are arranged and shaped to receive the sections 18. In this form of construction each two adjacent slits $a$ extend parallel to a radius of the bung ring and each slit $b$ connects the inner ends of the adjacent slits $a$.

In Figs. 21, 22, 23 and 24, the slits $a$, $b$, are disposed similar to the arrangement of the slits shown in Figs. 17, 18, 19 and 20, but the metal section is bent upwardly so as to lie in an inclined position, whereby portions of its side walls extend above the inner flange face to provide the interlocking devices. In Figs. 25, 26, 27 and 28, each slit $b$ connects the outer ends of the slits $a$, so that the metal section is connected integrally at its inner end to the flange 6 and is inclined upwardly so that its outer end is disposed above the inner flange face.

In Figs. 29, 30, 30a, 31 and 32, the parallel slits $a$ extend substantially tangentially to imaginary circles concentric to the bung ring axis and each slit $b$ extends substantially radially of said axis, the resulting metal sections 18 being inclined relative to the flange so as to project above its inner face to provide the interlocking devices. In this embodiment of the invention, each set of slits $a$, $b$, is preferably arranged in reverse relation to adjacent sets of slits, so that the free ends 18' of alternate sections 18 will be in position to resist rotative forces in one direction and the remaining sections will be in position to resist rotative forces in the opposite direction.

In Figs. 33, 34, 35, 36 and 37, the slits $a$, $b$, are shown disclosed in the same relation as the slits shown in Figs. 29, 30, 30a, 31 and 32, but the metal section 18 is bent up and disposed perpendicularly to the flange 6. In this form of construction, the slits $a$ are shorter than corresponding slits in the previously described forms, as the section 18 extends in the perpendicular direction but a short distance, no greater than its thickness.

In Figs. 38, 39, 40 and 41 I show another embodiment of the invention, wherein the interlocking devices comprise sections of the flange 6 upset relative to the flange in parallel relation thereto; that is, the metal of the flange is scored part way therethrough on all four sides of each device and the resulting section is stamped or displaced laterally, so that the device projects beyond the inner face of the flange.

In each form of construction, the metal wall 3 is embossed to accommodate the shape, size and arrangement of the projecting interlocking devices, in complementary relation thereto, to insure an interlock therewith.

In the embodiments herein disclosed, the metal wall may be suitably embossed to receive the projecting devices or both the flange and devices without imposing undue strains on such wall. Accordingly, danger of the metal cracking during shaping of the wall, with resulting repairs or leakage, is reduced to a minimum.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In combination, a sheet metal wall formed with an opening and provided with a laterally extending neck surrounding said opening, that portion of the wall adjacent to and surrounding said neck being embossed to form spaced pockets, and a bung ring comprising an internally threaded annulus having a flange at one end, said flange being provided with extensions which are folded over on the inner face of the flange to provide interlocking elements with contact edges extending radially for a substantial distance inwardly of the circumference of said flange, said elements fitting into said pockets to lock the ring against turning, and means for securing the other end of said annulus to said neck.

2. In combination, a sheet metal wall formed with an opening and provided with a laterally extending neck surrounding said opening, and a bung ring comprising an internally threaded body having a flange at one end, said flange engaging the face of the wall remote from said neck and provided on its inner surface with integrally connected elements extending radially a substantial distance inwardly from the periphery of the flange, that portion of the metal wall surrounding the opening being provided with pockets into which said elements fit, and means for securing the other end of said body to said neck.

3. A fitting for mounting in a wall, comprising a section of sheet metal shaped to form an annulus and a flange at one end of said annulus, said flange having on its periphery integral extensions which are folded over on one face of the flange and extend inwardly a substantial distance to form interlocking devices.

4. A fitting for mounting in a recessed metal wall and comprising a section of sheet metal shaped to form an annulus and a flange at one end of said annulus, spaced portions of said flange being slitted to form sections adapted to project out of the plane of the flange and integrally connected at one end thereto, said projections providing elements adapted to interlock with the corresponding recesses in the metal wall.

5. In a container having a metal wall formed with an opening and provided therearound with a laterally extending neck, a mounting for removably receiving a threaded device, comprising an internally threaded ring having a body extending through said neck and provided at one end with an outwardly extending flange engaging one face of said metal wall, spaced portions of the flange being slitted to form sections integrally connected to said flange, the free end portions of said sections being bent laterally relative to the inner face of said flange to form interlocking devices, the metal wall surrounding said neck being provided with embossments forming pockets into which said devices seat for engagement with the walls thereof, and means for securing the opposite end of said body to said neck.

6. In a container having a metal wall formed with an opening and provided therearound with a laterally extending neck, a mounting for removably receiving a threaded device, comprising an internally threaded ring having a body extending through said neck and provided at one end with an outwardly extending flange engaging one face of said metal wall, spaced portions of the flange being slitted to form radially extending sections integrally connected at their inner ends to said flange, the outer end portions of said sections being bent laterally relative to the inner face of said flange to provide interlocking devices, the metal wall surrounding said neck being provided with embossments forming pockets into which said devices seat for engagement with the walls thereof, and means for securing the opposite end of said body to said neck.

7. In a container having a metal wall formed with an opening and provided therearound with a laterally extending neck, a mounting for removably receiving a threaded device, comprising an internally threaded ring having a body extending through said neck and provided at one end with an outwardly extending flange engaging one face of said metal wall, spaced portions of the flange being slitted to form tangentially extending sections integrally connected at their inner ends to said flange, the outer end portions of said sections being bent laterally relative to the inner face of said flange to provide interlocking devices, the metal wall surrounding said neck being provided with embossments forming pockets into which said devices seat for engagement with the walls thereof, and means for securing the opposite end of said body to said neck.

8. In a container having a metal wall formed with an opening and provided therearound with a laterally extending neck, a mounting for removably receiving a threaded device, comprising an internally threaded ring having a body extending through said neck and provided at one end with an outwardly extending flange engaging one face of said metal wall, spaced portions of the flange being slitted to form sections integrally connected at their inner ends to said flange, said sections being bent into perpendicular relation to the inner face of said flange, to provide interlocking devices, the metal wall surrounding said neck being provided with embossments forming pockets into which said devices seat for engagement with the walls thereof, and means for securing the opposite end of said body to said neck.

9. In a container having a metal wall formed with an opening and provided therearound with a laterally extending neck, a mounting for removably receiving a threaded device, comprising an internally threaded ring having a body extending through said neck and provided at one end with an outwardly extending flange engaging one face of said metal wall, spaced portions of the flange being slitted to form sections integrally connected at one end to said flange, said sections being bent into perpendicular relation to the inner face of said flange and their end portions being disposed parallel to and off-set relative to said face to provide interlocking devices spaced inwardly from the circumferential edge of the flange and extending radially thereof for a substantial distance, the metal wall surrounding said neck being provided with embossments forming pockets into which said devices seat for engagement with the walls thereof, and means for securing the opposite end of said body to said neck.

HENRY M. DILLHOEFER.